US007752215B2

(12) United States Patent
Dettinger et al.

(10) Patent No.: US 7,752,215 B2
(45) Date of Patent: Jul. 6, 2010

(54) SYSTEM AND METHOD FOR PROTECTING SENSITIVE DATA

(75) Inventors: Richard D. Dettinger, Rochester, MN (US); Janice R. Glowacki, Rochester, MN (US); Daniel P. Kolz, Rochester, MN (US); Padma S. Rao, Rochester, MN (US); Marci L. Sperber, Rochester, MN (US); Shannon E. Wenzel, Colby, WI (US)

(73) Assignee: International Business Machines Corporation, Armonk, NY (US)

(*) Notice: Subject to any disclaimer, the term of this patent is extended or adjusted under 35 U.S.C. 154(b) by 688 days.

(21) Appl. No.: 11/246,792

(22) Filed: Oct. 7, 2005

(65) Prior Publication Data

US 2007/0083514 A1    Apr. 12, 2007

(51) Int. Cl.
*G06F 7/00*    (2006.01)
*G06F 17/30*   (2006.01)
*G06F 17/00*   (2006.01)

(52) U.S. Cl. ...................... 707/757; 707/754
(58) Field of Classification Search ............ 707/2–6, 707/9, 10, 103, 104.1; 705/1, 2, 14, 25; 709/207, 709/218, 224; 715/738, 751
See application file for complete search history.

(56) References Cited

U.S. PATENT DOCUMENTS

| | | | | |
|---|---|---|---|---|
| 6,643,640 | B1* | 11/2003 | Getchius et al. | 707/3 |
| 6,725,227 | B1  | 4/2004  | Li | |
| 2002/0095404 | A1* | 7/2002 | Davies et al. | 707/3 |
| 2002/0095405 | A1* | 7/2002 | Fujiwara | 707/3 |
| 2003/0126136 | A1* | 7/2003 | Omoigui | 707/10 |
| 2004/0139043 | A1* | 7/2004 | Lei et al. | 707/1 |
| 2004/0260695 | A1* | 12/2004 | Brill | 707/5 |
| 2006/0075328 | A1* | 4/2006 | Becker et al. | 715/503 |

OTHER PUBLICATIONS

U.S. Appl. No. 10/083,075, "Application Portability and Extensibility Through Database Schema and Query Abstraction", filed Feb. 26, 2002.
U.S. Appl. No. 10/284,944, "Method of Query Return Data Analysis for Early Warning Indicators of Possible Security Exposures", filed Oct. 31, 2002.
U.S. Appl. No. 10/264,243, "Intelligent Use of User Data to Preemptively Prevent Execution of Query Violating Access Controls", filed Oct. 3, 2002.

* cited by examiner

*Primary Examiner*—Yicun Wu
*Assistant Examiner*—Yu Zhao
(74) *Attorney, Agent, or Firm*—Patterson & Sheridan

(57) ABSTRACT

A method, system and article of manufacture for protecting sensitive data in databases and, more particularly, for managing access to sensitive data in a database. One embodiment comprises receiving a query against the data in the database comprising at least (i) a result field specification, and (ii) a sorting instruction. The method further comprises retrieving a result set from the database, and filtering the retrieved result set on the basis of predefined filtering rules to remove selected data from a selected result field of at least one data record included with the retrieved result set. The filtered result set is sorted according to the sorting instruction to produce the sorted result set, whereby the sorting is done independently of the removed selected data so that the sorted result set places the at least one data record at a position which is non-indicative of a value of the removed selected data.

14 Claims, 8 Drawing Sheets

SYSTEM AND METHOD FOR PROTECTING SENSITIVE DATA

CROSS-RELATED APPLICATION

This application is related to the following commonly owned applications: U.S. patent application Ser. No. 10/083,075, now U.S. Pat. No. 6,996,558 filed Feb. 26, 2002, entitled "APPLICATION PORTABILITY AND EXTENSIBILITY THROUGH DATABASE SCHEMA AND QUERY ABSTRACTION", U.S. patent application Ser. No. 10/284,944, now U.S. Pat. No. 6,928,554 filed Oct. 31, 2002, entitled "METHOD OF QUERY RETURN DATA ANALYSIS FOR EARLY WARNING INDICATORS OF POSSIBLE SECURITY EXPOSURES" and U.S. patent application Ser. No. 10/264,243, filed Oct. 3, 2002, entitled "INTELLIGENT USE OF USER DATA TO PRE-EMPTIVELY PREVENT EXECUTION OF A QUERY VIOLATING ACCESS CONTROLS", which are hereby incorporated herein in their entirety.

BACKGROUND OF THE INVENTION

1. Field of the Invention

The present invention generally relates to data processing and more particularly to protecting sensitive data in underlying databases.

2. Description of the Related Art

Databases are computerized information storage and retrieval systems. A relational database management system is a computer database management system (DBMS) that uses relational techniques for storing and retrieving data. The most prevalent type of database is the relational database, a tabular database in which data is defined so that it can be reorganized and accessed in a number of different ways.

Regardless of the particular architecture, in a DBMS, a requesting entity (e.g., an application or the operating system) demands access to a specified database by issuing a database access request. Such requests may include, for instance, simple catalog lookup requests or transactions and combinations of transactions that operate to read, change and add specified records in the database. These requests are made using high-level query languages such as the Structured Query Language (SQL). Illustratively, SQL is used to make interactive queries for getting information from and updating a database such as International Business Machines' (IBM) DB2, Microsoft's SQL Server, and database products from Oracle, Sybase, and Computer Associates. The term "query" denominates a set of commands for retrieving data from a stored database. Queries take the form of a command language that lets programmers and programs select, insert, update, find out the location of data, and so forth.

One significant issue in the context of databases is security. Databases often contain confidential or otherwise sensitive data which requires some degree of security to be protected from inappropriate and unauthorized access. For example, medical records contained in a medical data warehouse are generally considered highly personal and confidential. As such, access to medical records is typically restricted using various security mechanisms.

One of the mechanisms used to restrict access to data is the application of an output formatter. In general, an output formatter is a kind of filter that operates to selectively remove data from a result set. For example, an output formatter may be configured to remove a particular column from the result set. Alternatively, the output formatter may be configured to remove a value from selected cells in the result set.

Regarding the latter configuration, there may be several reasons for wanting to remove the values of selected cells from a given result set. For example, consider a researcher querying data in a medical data warehouse of a medical institution having sensitive data with respect to patients of the institution. The sensitive data might include HIV test results. While a column level filter could be applied for the HIV Test field, this may prevent the researcher from performing his/her study. Accordingly, a more granular value level filtering technique is required. For example, the basis for restriction may be the celebrity status of a given individual. Thus, while the researcher may be given access to HIV test results of the non-celebrity general public, his/her access to celebrity test results may be restricted because of the high degree of liability facing the institution should such information inadvertently be leaked. Accordingly, for a query that includes HIV Test as a result field, a given result set my appear as follows:

| Patient ID | Name | HIV Test |
|---|---|---|
| 2 | Paula Superstar | null |
| 4 | Joe | Negative |
| 8 | Jane | Negative |
| 9 | Joe Celebrity | null |
| 12 | Alex | Positive |

Assume that Joe, Jane and Alex are non-celebrity individuals, and that Paula Superstar and Joe Celebrity are well-known celebrity figures recognizable by the researcher. Accordingly, the output formatter has removed the actual value for the cells in the HIV Test fields for Paula Superstar and Joe Celebrity and replaced it with null values. In the result set above the patients are arranged according to their patient ID. Therefore, the researcher can make no conclusion about the actual value of the HIV Tests for Paula Superstar and Joe Celebrity. However, if the researcher runs the same query again but adds a command to sort the results based on the HIV Test field and to further sort based on the alphabetical order of the names, the arrangement of the results may be as follows:

| Patient ID | Name | HIV Test |
|---|---|---|
| 8 | Jane | Negative |
| 4 | Joe | Negative |
| 2 | Paula Superstar | null |
| 12 | Alex | Positive |
| 9 | Joe Celebrity | null |

Now, the researcher can conclude that the HIV test value for Joe Celebrity is positive and that the HIV test value for Paula Superstar is negative. This conclusion is based on the observation that Paula Superstar's record occurs before Alex's record and that Joe Celebrity's record occurs after Alex's record and Alex's HIV test value is positive.

Therefore, there is a need for improved security mechanisms for protecting sensitive data from inappropriate and unauthorized access.

SUMMARY OF THE INVENTION

The present invention generally is directed to a method, system and article of manufacture for protecting sensitive data in databases and, more particularly, for restricting access to sensitive data in an underlying database.

One embodiment provides a computer-implemented method of managing access to sensitive data in a database. The method comprises receiving a query against the data in the database. The query comprises at least (i) a result field specification including one or more result fields characterizing which fields are to be returned in a result set for the query, and (ii) a sorting instruction to sort the result set on the basis of a selected result field to produce a sorted result set. The method further comprises retrieving the result set from the database, and filtering the retrieved result set on the basis of predefined filtering rules to remove selected data from the selected result field of at least one data record included with the retrieved result set. The filtered result set is sorted according to the sorting instruction to produce the sorted result set, whereby the sorting is done independently of the removed selected data so that the sorted result set places the at least one data record at a position which is non-indicative of a value of the removed selected data.

Another embodiment provides a computer-readable medium containing a program which, when executed by a processor, performs operations for managing access to sensitive data in a database. The operations comprise receiving a query against the data in the database. The query comprises at least (i) a result field specification including one or more result fields characterizing which fields are to be returned in a result set for the query, and (ii) a sorting instruction to sort the result set on the basis of a selected result field to produce a sorted result set. The operations further comprise retrieving the result set from the database, and filtering the retrieved result set on the basis of predefined filtering rules to remove selected data from the selected result field of at least one data record included with the retrieved result set. The filtered result set is sorted according to the sorting instruction to produce the sorted result set, whereby the sorting is done independently of the removed selected data so that the sorted result set places the at least one data record at a position which is non-indicative of a value of the removed selected data.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Introduction

Figure 1:
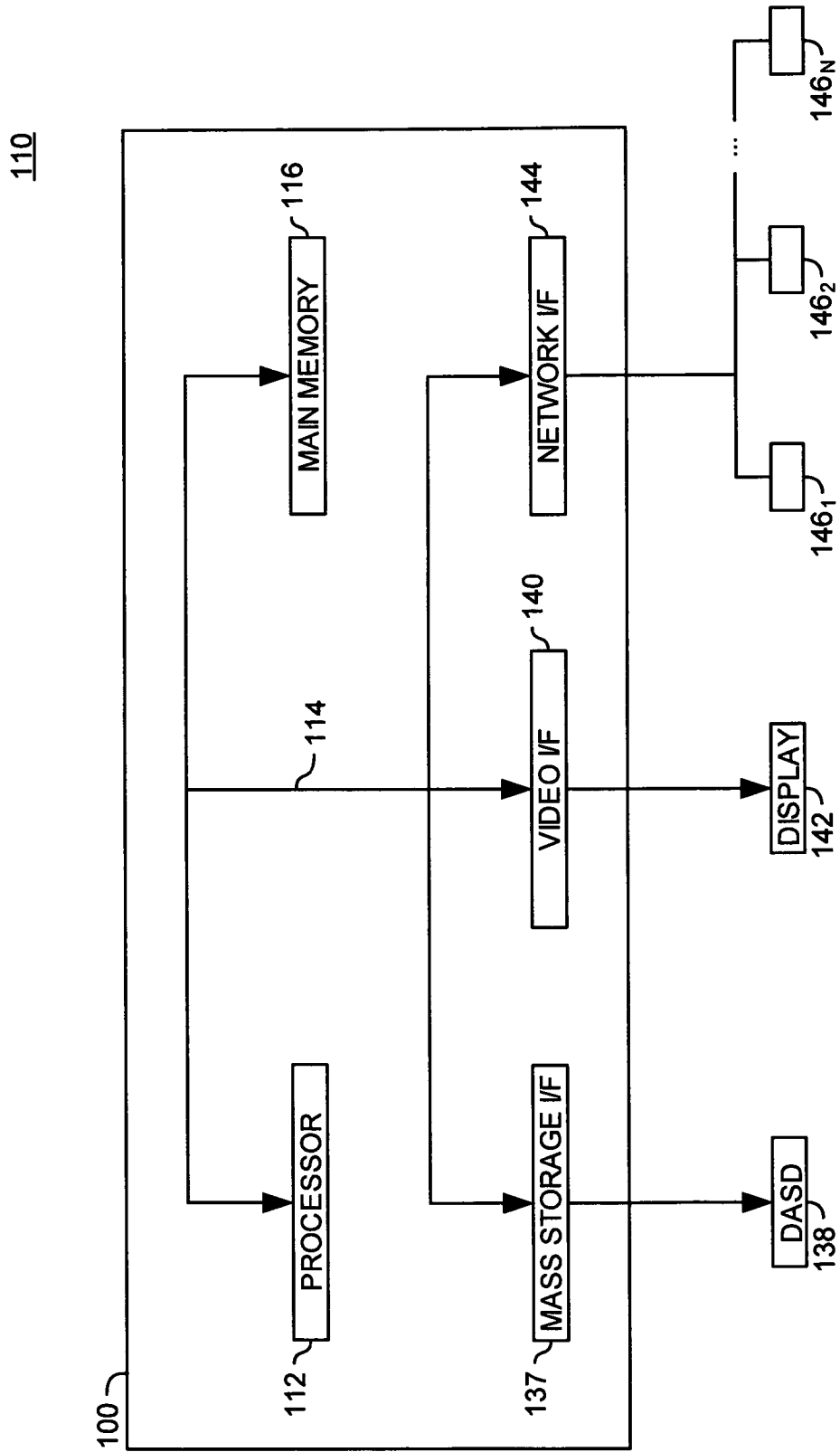
FIG. 1 is one embodiment of a computer system utilized in accordance with the invention.

The present invention is generally directed to a method, system and article of manufacture for protecting sensitive data in databases and, more particularly, for restricting access to sensitive data in an underlying database which is accessed using a query. In general, a query is issued by a requesting entity, such as a user, against an underlying database and includes a result field specification having at least one result field. The at least one result field characterizes the data that is to be returned in a result set for the query after execution of the query against the database. If the database contains sensitive data which is accessed by the query, the result set may include some or all of the sensitive data. If the result set includes some or all of the sensitive data, the sensitive data is protected by filtering the result set on the basis of predefined filtering rules to remove the sensitive data from the result set.

In one embodiment, the query includes a sorting instruction to sort the result set on the basis of a selected result field to produce a sorted result set. If the result set has been filtered, the filtered result set is sorted on the basis of the sorting instruction. However, as explained above, the filtered result set may still reveal information about the sensitive data which has been removed from the result set. More specifically, the information can be revealed because of a sorted position of one or more corresponding data records from which the sensitive data has been removed in the sorted result set. Therefore, in order to make this information unavailable in the sorted result set, the filtered result set is sorted according to the sorting instruction independently of the removed sensitive data. In the context of the invention, sorting the filtered result set independently of the removed sensitive data means that the one or more corresponding data records are placed at a position in the sorted result set which is non-indicative of a value of the removed sensitive data. Accordingly, the sorted position of the one or more data records from which the sensitive data has been removed cannot reveal any information about the sensitive data.

Preferred Embodiments

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and, unless explicitly present, are not considered elements or limitations of the appended claims.

One embodiment of the invention is implemented as a program product for use with a computer system such as, for example, computer system 110 shown in FIG. 1 and described below. The program(s) of the program product defines functions of the embodiments (including the methods described herein) and can be contained on a variety of computer-readable media. Illustrative computer-readable media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); or (iii) information conveyed to a computer by a communications medium, such as through a computer or telephone network, including wireless communications. The latter embodiment specifically includes information to/from the Internet and other networks. Such computer-readable media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The software of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular nomenclature that follows is used merely for convenience, and thus the invention should not be limited to use solely in any specific application identified and/or implied by such nomenclature.

An Exemplary Computing Environment

FIG. 1 shows a computer 100 (which is part of a computer system 110) that becomes a special-purpose computer according to an embodiment of the invention when configured with the features and functionality described herein. The computer 100 may represent any type of computer, computer system or other programmable electronic device, including a client computer, a server computer, a portable computer, a personal digital assistant (PDA), an embedded controller, a PC-based server, a minicomputer, a midrange computer, a mainframe computer, and other computers adapted to support the methods, apparatus, and article of manufacture of the invention. Illustratively, the computer 100 is part of a networked system 110. In this regard, the invention may be practiced in a distributed computing environment in which tasks are performed by remote processing devices that are linked through a communications network. In a distributed computing environment, program modules may be located in both local and remote memory storage devices. In another embodiment, the computer 100 is a standalone device. For purposes of construing the claims, the term "computer" shall mean any computerized device having at least one processor. The computer may be a standalone device or part of a network in which case the computer may be coupled by communication means (e.g., a local area network or a wide area network) to another device (i.e., another computer).

In any case, it is understood that FIG. 1 is merely one configuration for a computer system. Embodiments of the invention can apply to any comparable configuration, regardless of whether the computer 100 is a complicated multi-user apparatus, a single-user workstation, or a network appliance that does not have non-volatile storage of its own.

The computer 100 could include a number of operators and peripheral systems as shown, for example, by a mass storage interface 137 operably connected to a storage device 138, by a video interface 140 operably connected to a display 142, and by a network interface 144 operably connected to the plurality of networked devices 146 (which may be representative of the Internet) via a suitable network. Although storage 138 is shown as a single unit, it could be any combination of fixed and/or removable storage devices, such as fixed disc drives, floppy disc drives, tape drives, removable memory cards, or optical storage. The display 142 may be any video output device for outputting viewable information.

Computer 100 is shown comprising at least one processor 112, which obtains instructions and data via a bus 114 from a main memory 116. The processor 112 could be any processor adapted to support the methods of the invention. In particular, the computer processor 112 is selected to support the features of the present invention. Illustratively, the processor is a PowerPC® processor available from International Business Machines Corporation of Armonk, N.Y.

The main memory 116 is any memory sufficiently large to hold the necessary programs and data structures. Main memory 116 could be one or a combination of memory devices, including Random Access Memory, nonvolatile or backup memory, (e.g., programmable or Flash memories, read-only memories, etc.). In addition, memory 116 may be considered to include memory physically located elsewhere in the computer system 110, for example, any storage capacity used as virtual memory or stored on a mass storage device (e.g., direct access storage device 138) or on another computer coupled to the computer 100 via bus 114. Thus, main memory 116 and storage device 138 could be part of one virtual address space spanning multiple primary and secondary storage devices.

An Exemplary Query Creation and Execution Environment

Figure 2:
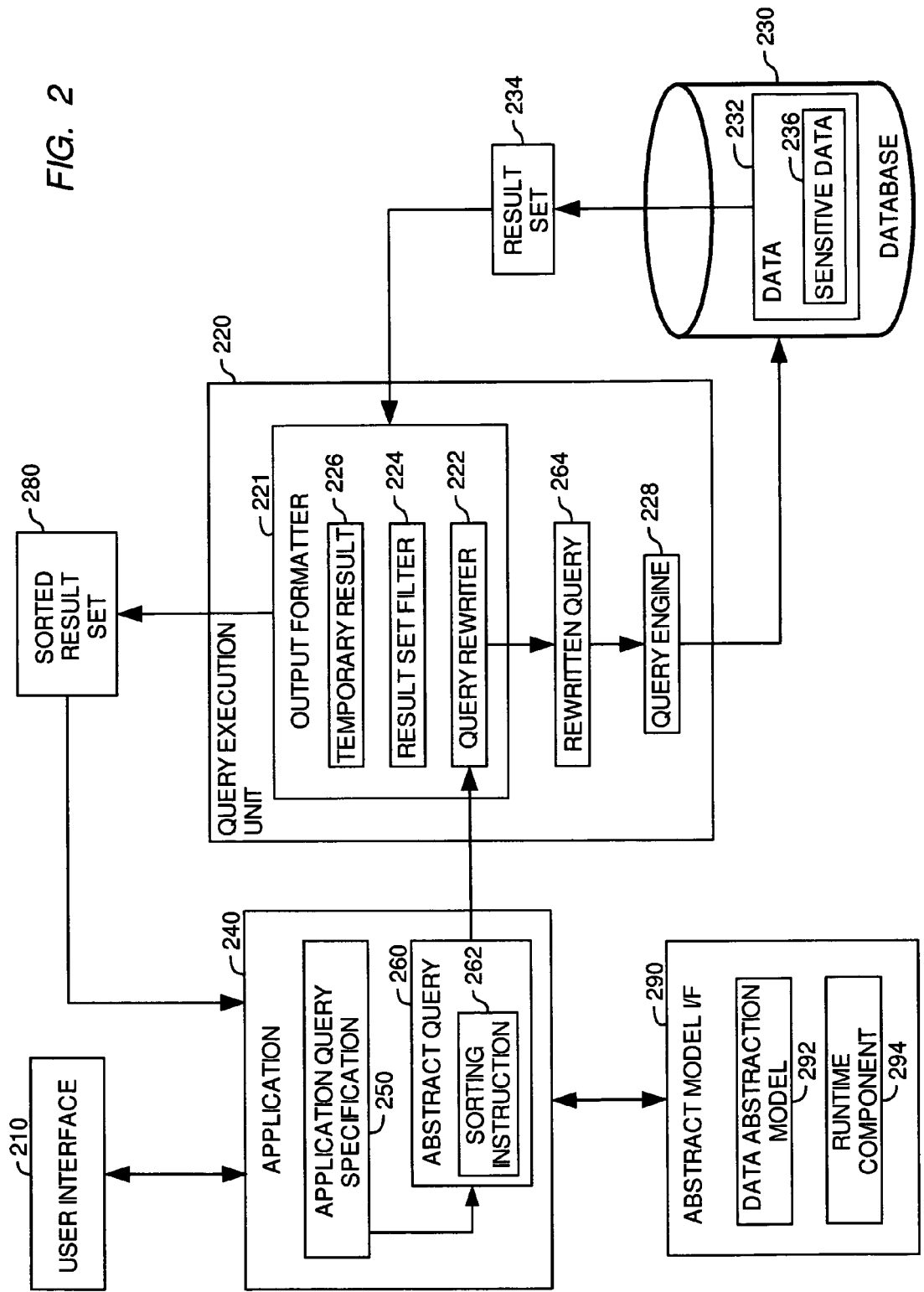
FIG. 2 is a relational view of software components in one embodiment.

Referring now to FIG. 2, a relational view of software components in one embodiment is illustrated. The software components illustratively include a user interface 210, a database 230, one or more applications 240 (only one application is illustrated for simplicity), a query execution unit 220, and an abstract model interface 290.

According to one aspect, the application 240 (and more generally, any requesting entity including, at the highest level, users) issues queries against data 232 in the database 230. In general, the queries issued by the application 240 are defined according to an application query specification 250 and may be predefined (i.e., hard coded as part of the application 240) or generated in response to input (e.g., user input). The application query specification(s) 250 is further described below with reference to FIGS. 3-6.

Illustratively, the queries issued by the application 240 are created by users using the user interface 210, which can be any suitable user interface configured to create/submit queries. According to one aspect, the user interface 210 is a graphical user interface. However, it should be noted that the user interface 210 is only shown by way of example; any suitable requesting entity may create and submit queries against the database 230 (e.g., the application 240, an operating system or an end user). Accordingly, all such implementations are broadly contemplated.

In one embodiment, the requesting entity accesses a suitable database connectivity tool such as a Web application, an Open DataBase Connectivity (ODBC) driver, a Java DataBase Connectivity (JDBC) driver or a Java Application Programming Interface (Java API) for creation of a query. A Web application is an application that is accessible by a Web browser and that provides some function beyond static display of information, for instance by allowing the requesting entity to query the database 230. An ODBC driver is a driver that provides a set of standard application programming interfaces to perform database functions such as connecting to the database 230, performing dynamic SQL functions, and committing or rolling back database transactions. A JDBC driver is a program included with a database management system to support JDBC standard access between the database 230 and Java applications. A Java API is a Java-based interface that allows an application program (e.g., the requesting entity, the ODBC or the JDBC) that is written in a high-level language to use specific data or functions of an operating system or another program (e.g., the application 240).

Accordingly, the queries issued by the application 240 can be in physical form, such as SQL and/or XML queries, which are consistent with the physical representation of the data 232 for execution against the database 230. Alternatively, the queries issued by the application 240 are composed using the abstract model interface 290. Such queries are referred to herein as "abstract queries". The abstract model interface 290 is further described below with reference to FIGS. 3-6. The abstract queries are transformed into a form consistent with the physical representation of the data 232 for execution against the database 230. In the illustrated example, an abstract query 260 is created on the basis of logical fields defined by a data abstraction model 292. By way of example, the abstract query 260 is translated by a runtime component 294 into a concrete (i.e., executable) query which is executed against the data 232 of the database 230 to determine a result set 234 for the abstract query 260. Illustratively, the abstract query 260 includes a sorting instruction 262 configured to sort the result set 234 on the basis of a selected result field included therewith.

The database 230 is shown as a single database having the data 232, for simplicity. However, a given query can be executed against multiple databases which can be distributed relative to one another. Moreover, one or more databases can be distributed to one or more networked devices (e.g., networked devices 146 of FIG. 1). The database 230 is representative of any collection of data regardless of the particular physical representation of the data. A physical representation of data defines an organizational schema of the data. By way of illustration, the database 230 may be organized according to a relational schema (accessible by SQL queries) or according to an XML schema (accessible by XML queries). However, the invention is not limited to a particular schema and contemplates extension to schemas presently unknown. As used herein, the term "schema" generically refers to a particular arrangement of the data 232.

In one embodiment, the data 232 in the database 230 includes sensitive data 236 which requires some degree of security to be protected from inappropriate and unauthorized access. For example, the sensitive data 236 may consist of medical records which are considered highly personal and confidential. In order to protect the sensitive data 236, a suitable processing of the abstract query 260 and the result set 234 is performed by the query execution unit 220. The processing of the abstract query 260 can be performed prior to translation of the abstract query 260 into a concrete query. Alternatively, the concrete query can be processed prior to execution against the database 230, i.e., prior to determining the result set 234. The result set 234 is processed prior to output thereof to the requesting entity.

In one embodiment, the abstract query 260 is rewritten by a query rewriter 222 in order to remove the sorting instruction 262 therefrom. Thereby, a rewritten query 264 is generated. The rewritten query 264 is executed by a query engine 228 against the data 232 in the database 230 to obtain the result set 234. The result set 234 is then processed by the output formatter 221.

The output formatter 221 determines whether the result set 234 contains some or all of the sensitive data 236. It should be noted that any suitable technique for determining whether the result set 234 contains some or all of the sensitive data 236 is broadly contemplated. Furthermore, it should be noted that the output formatter 221 is only described by way of example and that any data processor which is configured for a suitable post query data processing is broadly contemplated. If the result set 234 includes at least a portion of the sensitive data 236, the output formatter 221 performs suitable operations to protect the at least one portion of the sensitive data 236, as described below.

In one embodiment, the result set 234 is filtered by a result set filter 224 having predefined filtering rules to remove the at least one portion of the sensitive data 236 from the result set 234. By way of example, the predefined filtering rules are configured to remove values of corresponding cells from one or more selected data records having the at least one portion of the sensitive data 236 from the result set 234. Accordingly, by filtering the result set 234 a temporary result 226 is generated.

The temporary result 226 is stored in the database 230 and sorted according to the sorting instruction 262 independently of the removed sensitive data, whereby a sorted result set 280 is generated. According to one embodiment, the sorting is done by the output formatter 221; although the sorting may be done by a different component. More specifically, the one or more selected data records are placed at a position in the sorted result set 280 which is non-indicative of a value of the removed sensitive data in the corresponding cells. Accordingly, the position of the one or more selected data records in the sorted result set 280 cannot reveal any information about the removed sensitive data, whereby the removed sensitive data is protected. The sorted result set 280 is then output to the application 240.

It should be noted that the query execution unit 220 is illustrated having the output formatter 221 and the query engine 228. Furthermore, the query rewriter 222, the result set filter 224 and the temporary result 226 are illustratively shown as part of the output formatter 221. However, it should be noted that the output formatter 221 is merely described by way of example to illustrate a component which is suitable to implement aspects of the invention. The output formatter 221 should not be understood as an essential component of the invention and the functions of the output formatter 221 can be implemented by any suitable data processor appropriately configured. Furthermore, other implementations which are suitable to perform methods of the present invention are also possible. For instance, in one embodiment the query rewriter 222 is implemented as a separate software component included with the query execution unit 220. In another embodiment, the temporary result 226 is stored in the database 230. All such implementations are broadly contemplated.

Interaction and operation of the query execution unit 220 for processing of the abstract query 260 and the result set 234 is described in more detail below with reference to FIGS. 7-8. Operation of the abstract model interface 290 for creation of abstract queries and transformation of abstract queries into concrete queries and execution of the concrete queries is described below with reference to FIGS. 3-6.

Logical/Runtime View of Environment

Figure 3:
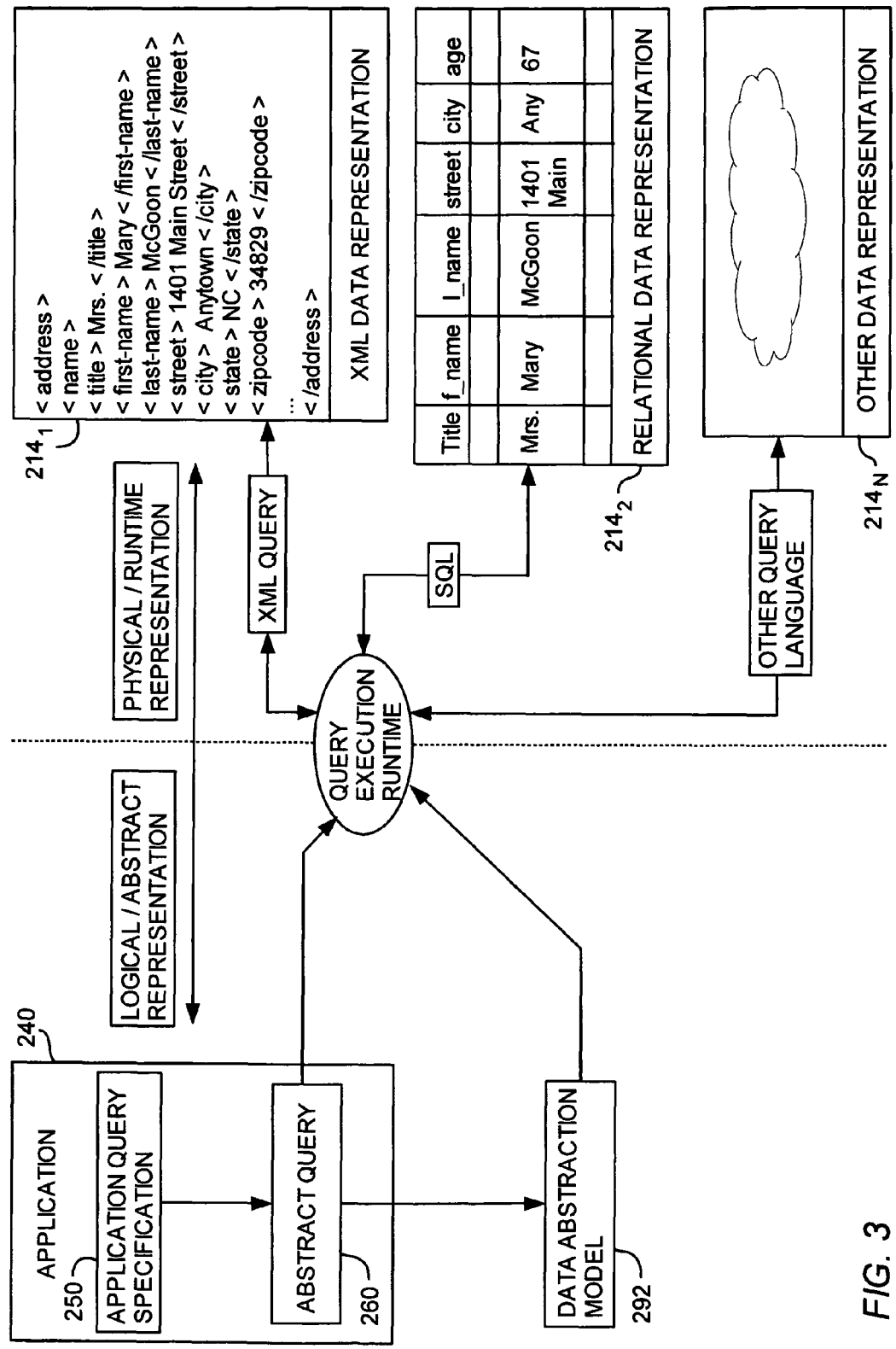
FIGS. 3-4 are relational views of software components in one embodiment.
Figure 4:
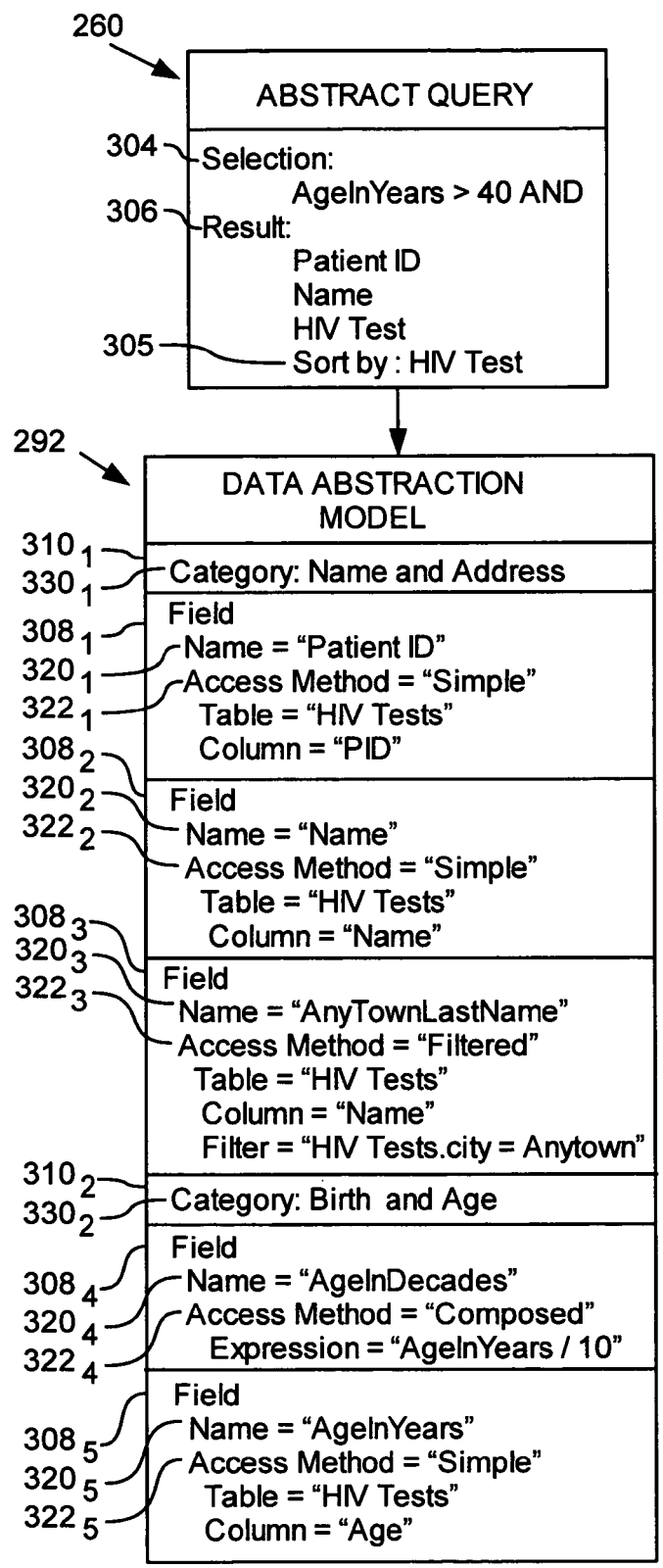

FIGS. 3-4 show an illustrative relational view of the applications 240, the application query specifications 250 and the data abstraction model 292 of FIG. 2 and other components of the invention. A requesting entity (e.g., one of the applications 240 or a user) issues the query 260 as defined by the respective application query specification 250 of the requesting entity. The resulting query 260 is generally referred to herein as an "abstract query" because the query is composed according to abstract (i.e., logical) fields rather than by direct reference to the underlying physical data entities in the database 230 of FIG. 2. As a result, abstract queries may be defined that are independent of the particular underlying data representation used. In one embodiment, the application query specification 250 may include both criteria used for data selection (selection criteria 304) and an explicit specification of the fields to be returned (results specification 306) based on the selection criteria 304, as illustrated in FIG. 4. The explicit specification of the fields to be returned may include one or more formatting options. Illustratively, the results specification 306 includes an exemplary sorting instruction 305 (e.g., sorting instruction 262 of FIG. 2) instructing to sort an obtained result set with respect to a selected result field.

As was noted above, the logical fields specified by the application query specification 250 and used to compose the abstract query 260 are defined by the data abstraction model 292. In general, the data abstraction model 292 exposes information as a set of logical fields that may be used within a query (e.g., the abstract query 260) issued by the application 240 to specify criteria for data selection and specify the form of result data returned from a query operation. The logical fields are defined independently of the underlying data representation being used in a corresponding database (e.g., database 230 of FIG. 2), thereby allowing queries to be formed that are loosely coupled to the underlying data representation.

In one embodiment, illustrated in FIG. 4, the data abstraction model 292 comprises a plurality of field specifications $308_1$, $308_2$, $308_3$, $308_4$ and $308_5$ (five shown by way of example), collectively referred to as the field specifications 308 (also referred to hereinafter as "field definitions"). Specifically, a field specification is provided for each logical field available for composition of an abstract query. Each field specification may contain one or more attributes. Illustratively, the field specifications 308 include a logical field name attribute $320_1$, $320_2$, $320_3$, $320_4$, $320_5$ (collectively, field name 320) and an associated access method attribute $322_1$, $322_2$, $322_3$, $322_4$, $322_5$ (collectively, access methods 322). Each attribute may have a value. For example, logical field name attribute $320_1$, has the value "Patient ID", and access method attribute $322_1$ has the value "Simple". Furthermore, each attribute may include one or more associated abstract properties. Each abstract property describes a characteristic of a data structure and has an associated value. In the context of the invention, a data structure refers to a part of the underlying physical representation that is defined by one or more physical entities of the data corresponding to the logical field. In particular, an abstract property may represent data location metadata abstractly describing a location of a physical data entity corresponding to the data structure, like a name of a database table or a name of a column in a database table. Illustratively, the access method attribute $322_1$ includes data location metadata "Table" and "Column". Furthermore, data location metadata "Table" has the value "HIV Tests" and data location metadata "Column" has the value "PID". Accordingly, assuming an underlying relational database schema in the present example, the values of data location metadata "Table" and "Column" point to a table "HIV Tests" having a column "PID".

In one embodiment, groups (i.e. two or more) of logical fields may be part of categories. Accordingly, the data abstraction model 292 includes a plurality of category specifications $310_1$ and $310_2$ (two shown by way of example), collectively referred to as the category specifications. In one embodiment, a category specification is provided for each logical grouping of two or more logical fields. For example, logical fields $308_{1-3}$ and $308_{4-5}$ are part of the category specifications $310_1$ and $310_2$, respectively. A category specification is also referred to herein simply as a "category". The categories are distinguished according to a category name, e.g., category names $330_1$ and $330_2$ (collectively, category name(s) 330). In the present illustration, the logical fields $308_{1-3}$ are part of the "Name and Address" category and logical fields $308_{4-5}$ are part of the "Birth and Age" category.

The access methods 322 generally associate (i.e., map) the logical field names to data in the database (e.g., database 230 of FIG. 2). As illustrated in FIG. 3, the access methods associate the logical field names to a particular physical data representation $214_1$, $214_2$, ... $214_N$ in the database. By way of illustration, two data representations are shown, an XML data representation $214_1$ and a relational data representation $214_2$. However, the physical data representation $214_N$ indicates that any other data representation, known or unknown, is contemplated. In one embodiment, a single data abstraction model 292 contains field specifications (with associated access methods) for two or more physical data representations 214. In an alternative embodiment, a different single data abstraction model 292 is provided for each separate physical data representation 214.

Any number of access methods is contemplated depending upon the number of different types of logical fields to be supported. In one embodiment, access methods for simple fields, filtered fields and composed fields are provided. The field specifications $308_1$, $308_2$ and $308_5$ exemplify simple field access methods $322_1$, $322_2$, and $322_5$, respectively. Simple fields are mapped directly to a particular entity in the underlying physical representation (e.g., a field mapped to a given database table and column). By way of illustration, as described above, the simple field access method $322_1$ shown in FIG. 4 maps the logical field name $320_1$ ("Patient ID") to a column named "PID" in a table named "HIV Tests". The field specification $308_3$ exemplifies a filtered field access method $322_3$. Filtered fields identify an associated physical entity and provide filters used to define a particular subset of items within the physical representation. An example is provided in FIG. 4 in which the filtered field access method $322_3$ maps the logical field name $320_3$ ("AnyTownLastName") to a physical entity in a column named "Name" in a table named "HIV Tests" and defines a filter for individuals in the city of "Anytown". Another example of a filtered field is a New York ZIP code field that maps to the physical representation of ZIP codes and restricts the data only to those ZIP codes defined for the state of New York. The field specification 3084 exemplifies a composed field access method $322_4$. Composed access methods compute a logical field from one or more physical fields using an expression supplied as part of the access method definition. In this way, information which does not exist in the underlying physical data representation may be computed. In the example illustrated in FIG. 4 the composed field access method $322_4$ maps the logical field name $320_4$ "AgeInDecades" to "AgeInYears/10". Another example is a sales tax field that is composed by multiplying a sales price field by a sales tax rate.

It is contemplated that the formats for any given data type (e.g., dates, decimal numbers, etc.) of the underlying data may vary. Accordingly, in one embodiment, the field specifications 308 include a type attribute which reflects the format of the underlying data. However, in another embodiment, the data format of the field specifications 308 is different from the associated underlying physical data, in which case a conversion of the underlying physical data into the format of the logical field is required.

By way of example, the field specifications 308 of the data abstraction model 292 shown in FIG. 4 are representative of logical fields mapped to data represented in the relational data representation $214_2$ shown in FIG. 3. However, other instances of the data abstraction model 292 map logical fields to other physical representations, such as XML.

An illustrative abstract query corresponding to the abstract query 260 shown in FIG. 4 is shown in Table I below. By way of illustration, the illustrative abstract query is defined using XML. However, any other language may be used to advantage.

TABLE I

ABSTRACT QUERY EXAMPLE

001 <?xml version="1.0"?>
002 <!--Query string representation: (AgeInYears > "40"-->
003 <QueryAbstraction>
004   <Selection>
005     <Condition internalID="4">
006     <Condition field="AgeInYears" operator="GT" value="40"
007         internalID="1"/>
008   </Selection>
009   <Results>
010     <Field name="Patient ID"/>
011     <Field name="Name"/>
012     <Field name="HIV Test" sortPriority="10"/>
013   </Results>
014 </QueryAbstraction>

Illustratively, the abstract query shown in Table I includes a selection specification (lines 004-008) containing selection criteria and a results specification (lines 009-013). In one embodiment, a selection criterion consists of a field name (for a logical field), a comparison operator (=, >, <, etc) and a value expression (what is the field being compared to). In one embodiment, result specification is a list of abstract fields that are to be returned as a result of query execution. A result specification in the abstract query may consist of a field name and formatting options, such as sorting criteria. By way of example, the abstract field specified in line 012 is associated with the sorting instruction 305.

An illustrative data abstraction model (DAM) corresponding to the data abstraction model 292 shown in FIG. 4 is shown in Table II below. By way of illustration, the illustrative Data Abstraction Model is defined using XML. However, any other language may be used to advantage.

TABLE II

DATA ABSTRACTION MODEL EXAMPLE

001 <?xml version="1.0"?>
002 <DataAbstraction>
003   <Category name="Name and Address">
004     <Field queryable="Yes" name="Patient ID" displayable="Yes">

TABLE II-continued

DATA ABSTRACTION MODEL EXAMPLE

005       <AccessMethod>
006         <Simple columnName="PID" tableName="HIV
              Tests"></Simple>
007       </AccessMethod>
008     </Field>
009     <Field queryable="Yes" name="Name" displayable="Yes">
010       <AccessMethod>
011         <Simple columnName="Name" tableName="HIV
              Tests"></Simple>
012       </AccessMethod>
013     </Field>
014     <Field queryable="Yes" name="AnyTownLastName"
          displayable="Yes">
015       <AccessMethod>
016         <Filter columnName="Name" tableName="HIV Tests"
017           > HIV Tests.city=Anytown </Filter>
018       </AccessMethod>
019     </Field>
020   </Category>
021   <Category name="Birth and Age">
022     <Field queryable="Yes" name="AgeInDecades" displayable=
          "Yes">
023       <AccessMethod>
024         <Composed columnName="Age" tableName="HIV Tests"
025           Expression="columnName/10"> </Composed>
026       </AccessMethod>
027     </Field>
028     <Field queryable="Yes" name="AgeInYears" displayable=
          "Yes">
029       <AccessMethod>
030         <Simple columnName="Age" tableName="HIV
              Tests"></Simple>
031       </AccessMethod>
032     </Field>
033   </Category>
034 </DataAbstraction>

By way of example, note that lines 004-008 correspond to the first field specification $308_1$, of the DAM 292 shown in FIG. 4 and lines 009-013 correspond to the second field specification $308_2$.

As was noted above, the abstract query of Table I can be transformed into a concrete query for query execution. An exemplary method for transforming an abstract query into a concrete query is described below with reference to FIGS. 5-6.

Transforming an Abstract Query into a Concrete Query

Figure 5:
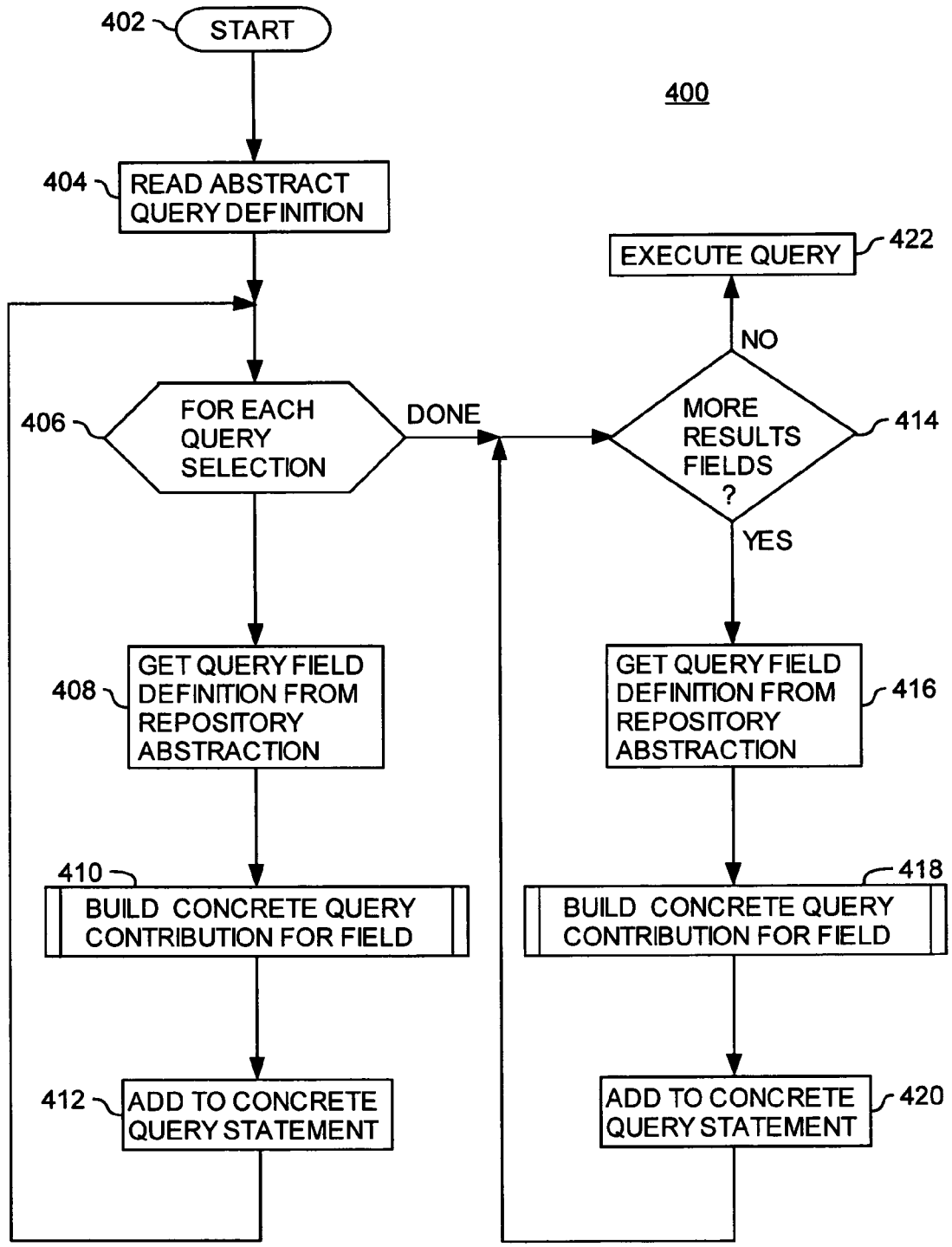
FIGS. 5-6 are flow charts illustrating the operation of a runtime component.

Referring now to FIG. 5, an illustrative runtime method 400 exemplifying one embodiment of the operation of the runtime component 294 of FIG. 2 is shown. The method 400 is entered at step 402 when the runtime component 294 receives as input an abstract query (such as the abstract query shown in Table I). At step 404, the runtime component 294 reads and parses the abstract query and locates individual selection criteria and desired result fields. At step 406, the runtime component 294 enters a loop (defined by steps 406, 408, 410 and 412) for processing each query selection criteria statement present in the abstract query, thereby building a data selection portion of a concrete query. In one embodiment, a selection criterion consists of a field name (for a logical field), a comparison operator (=, >, <, etc) and a value expression (what is the field being compared to). At step 408, the runtime component 294 uses the field name from a selection criterion of the abstract query to look up the definition of the field in the data abstraction model 292. As noted above, the field definition includes a definition of the access method used to access the data structure associated with the field. The runtime component 294 then builds (step 410) a concrete query contribution for the logical field being processed. As defined herein, a concrete query contribution is a portion of a concrete query that is used to perform data selection based on the current logical field. A concrete query is a query represented in languages like SQL and XML Query and is consistent with the data of a given physical data repository (e.g., a relational database or XML repository). Accordingly, the concrete query is used to locate and retrieve data from the physical data repository, represented by the database 230 shown in FIG. 2. The concrete query contribution generated for the current field is then added to a concrete query statement (step 412). The method 400 then returns to step 406 to begin processing for the next field of the abstract query. Accordingly, the process entered at step 406 is iterated for each data selection field in the abstract query, thereby contributing additional content to the eventual query to be performed.

After building the data selection portion of the concrete query, the runtime component 294 identifies the information to be returned as a result of query execution. As described above, in one embodiment, the abstract query defines a list of result fields, i.e., a list of logical fields that are to be returned as a result of query execution, referred to herein as a result specification. A result specification in the abstract query may consist of a field name and formatting options, such as sorting criteria. Accordingly, the method 400 enters a loop at step 414 (defined by steps 414, 416, 418 and 420) to add result field definitions to the concrete query being generated. At step 416, the runtime component 294 looks up a result field name (from the result specification of the abstract query) in the data abstraction model 292 and then retrieves a result field definition from the data abstraction model 292 to identify the physical location of data to be returned for the current logical result field. The runtime component 294 then builds (at step 418) a concrete query contribution (of the concrete query that identifies physical location of data to be returned) for the logical result field. At step 420, the concrete query contribution is then added to the concrete query statement. Once each of the result specifications in the abstract query has been processed, the concrete query is executed at step 422.

Figure 6:
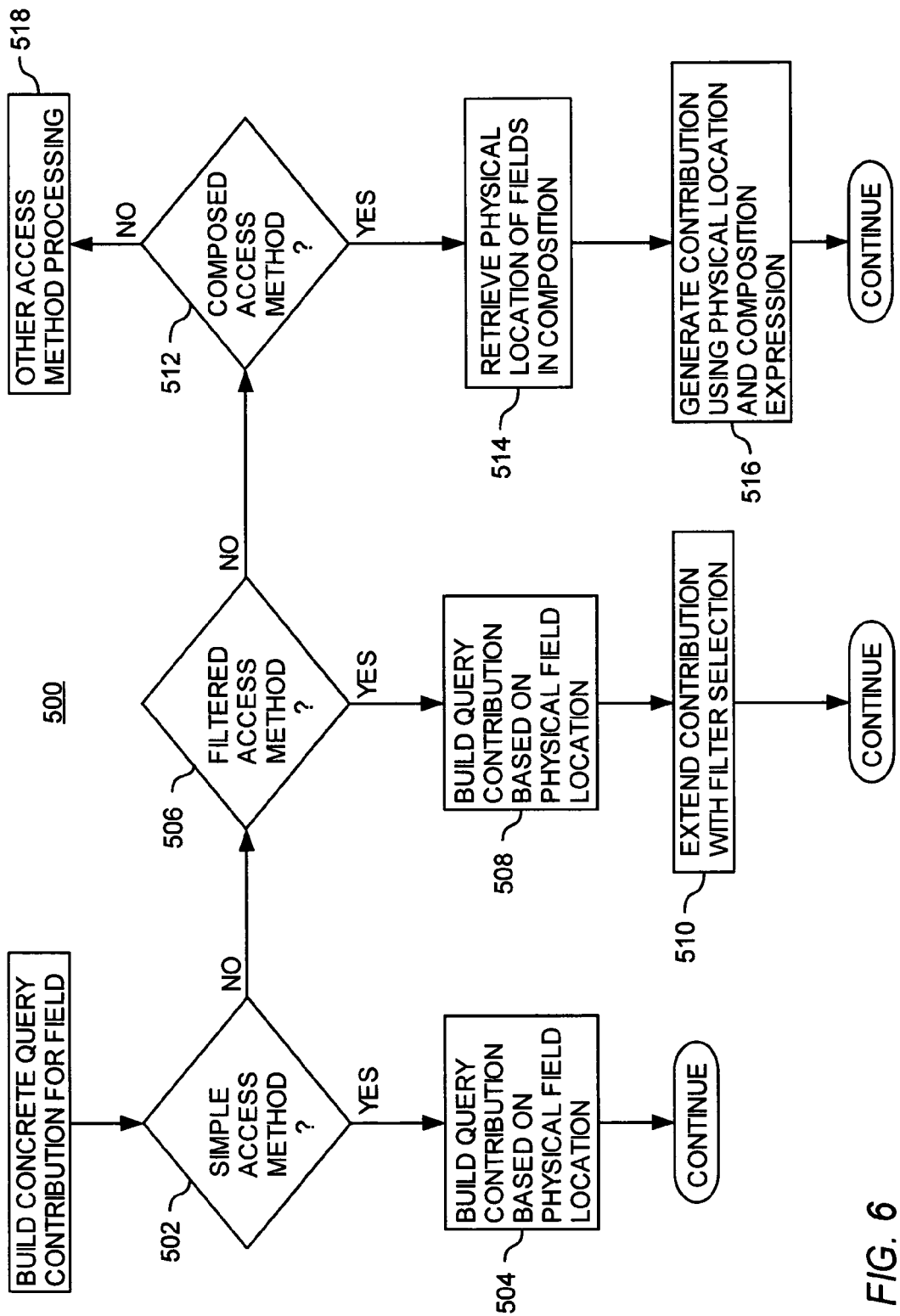

One embodiment of a method 500 for building a concrete query contribution for a logical field according to steps 410 and 418 is described with reference to FIG. 6. At step 502, the method 500 queries whether the access method associated with the current logical field is a simple access method. If so, the concrete query contribution is built (step 504) based on physical data location information and processing then continues according to method 400 described above. Otherwise, processing continues to step 506 to query whether the access method associated with the current logical field is a filtered access method. If so, the concrete query contribution is built (step 508) based on physical data location information for a given data structure(s). At step 510, the concrete query contribution is extended with additional logic (filter selection) used to subset data associated with the given data structure(s). Processing then continues according to method 400 described above.

If the access method is not a filtered access method, processing proceeds from step 506 to step 512 where the method 500 queries whether the access method is a composed access method. If the access method is a composed access method, the physical data location for each sub-field reference in the composed field expression is located and retrieved at step 514. At step 516, the physical field location information of the composed field expression is substituted for the logical field references of the composed field expression, whereby the concrete query contribution is generated. Processing then continues according to method 400 described above.

If the access method is not a composed access method, processing proceeds from step 512 to step 518. Step 518 is representative of any other access method types contemplated as embodiments of the present invention. However, it should be understood that embodiments are contemplated in which less than all the available access methods are implemented. For example, in a particular embodiment only simple access methods are used. In another embodiment, only simple access methods and filtered access methods are used.

Processing a Query and a Result Set to Protect Sensitive Data

Figure 7:
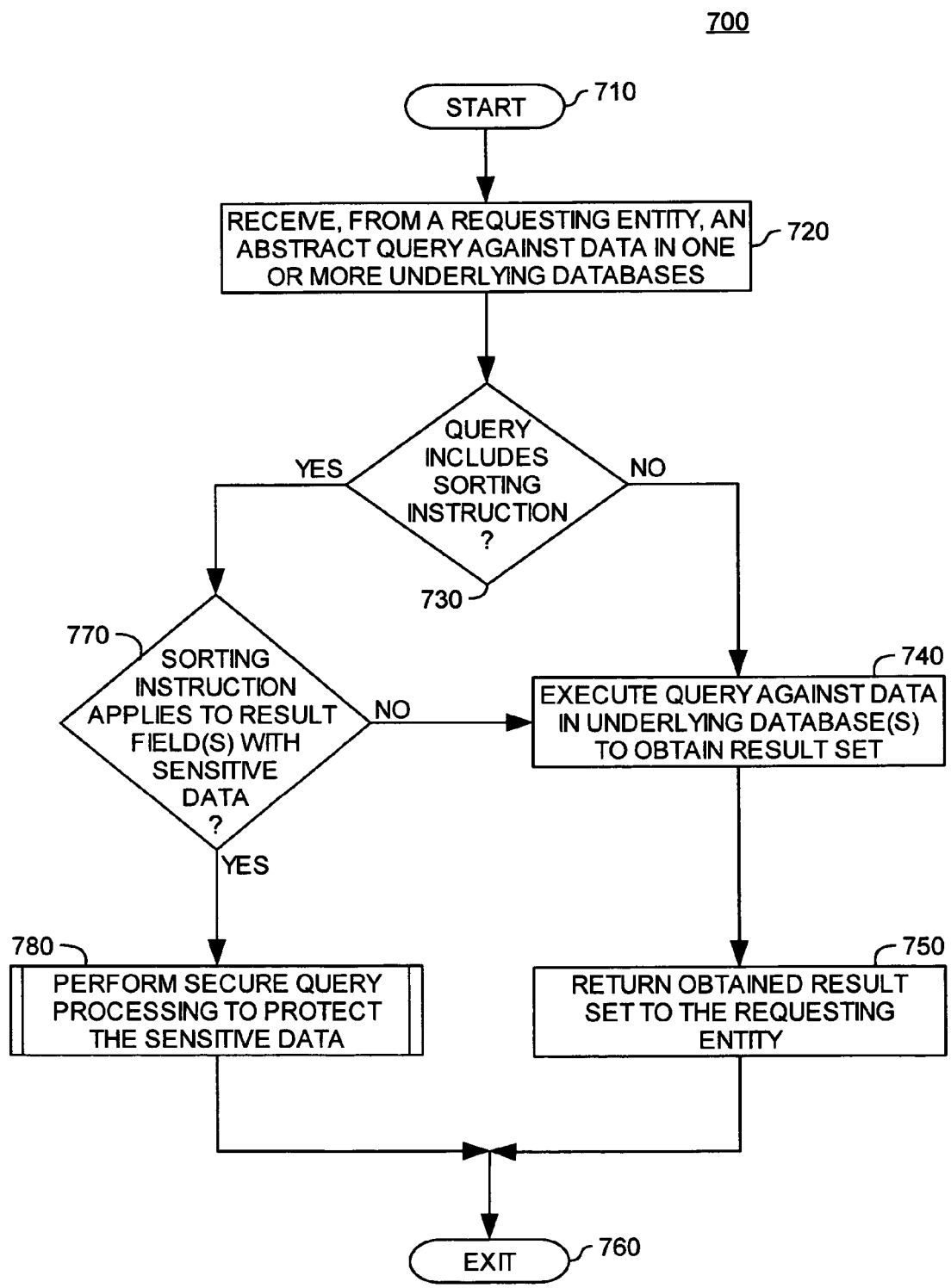
FIG. 7 is a flow chart illustrating a method of managing execution of a query against an underlying database in one embodiment.

Referring now to FIG. 7, one embodiment of a method 700 for managing execution of a query against data in a database (e.g., data 232 of database 230 of FIG. 2) in order to protect sensitive data (e.g., sensitive data 236 of FIG. 2) in the database is illustrated. In one embodiment, at least part of the steps of the method 700 are performed by the query execution unit 220 of FIG. 2. Furthermore, at least several steps of the method 700 can be performed on the basis of user input received via the user interface 210 of FIG. 2. Method 700 starts at step 710.

At step 720, a query is received from a requesting entity (e.g., application 240 of FIG. 2 or a user). By way of example, the following steps of the method 700 are described with reference to an abstract query (e.g., abstract query 260 of FIG. 2). However, it should be noted that the invention is not limited to abstract queries and that any other query types are broadly contemplated.

Assume now that the query is created by a user using the user interface 210 of FIG. 2 and issued against a database having a table "HIV Tests" defining the data 232 of FIG. 2. An exemplary "HIV Tests" table is shown in Table III below.

TABLE III

EXEMPLARY DATABASE TABLE "HIV TESTS"

| 001 | PID | Name | Age | Gender | HIV Test |
|---|---|---|---|---|---|
| 002 | 1 | Steven | 25 | Male | Negative |
| 003 | 2 | Paula Superstar | 47 | Female | Negative |
| 004 | 3 | John | 33 | Male | Positive |
| 005 | 4 | Joe | 50 | Male | Negative |
| 006 | 5 | Susan | 26 | Female | Negative |
| 007 | 6 | Eric | 32 | Male | Positive |
| 008 | 7 | Henry | 25 | Male | Negative |
| 009 | 8 | Jane | 49 | Female | Negative |
| 010 | 9 | Joe Celebrity | 55 | Male | Positive |
| 011 | 10 | Donald | 35 | Male | Negative |
| 012 | 11 | Angie | 23 | Female | Negative |
| 013 | 12 | Alex | 67 | Male | Positive |

As can be seen from Table III, the "HIV Tests" table illustratively contains name, age, gender and HIV test result information about each patient. The "HIV tests" table further includes a "PID" column having values that uniquely identify each patient. Assume now that the HIV test results of Paula Superstar (line 003) and Joe Celebrity (line 010) represent sensitive data which requires some degree of security to be protected from inappropriate and unauthorized access.

Assume further that the abstract query illustrated in Table IV below is issued by the user against the HIV Tests table of Table III. For simplicity, the exemplary abstract query of Table IV is illustrated in natural language. Persons skilled in the art will readily recognize corresponding XML representations, such as used to describe the exemplary abstract query of Table I. However, it should be noted that implementation of the exemplary abstract query is not limited to a particular machine-readable language and that an implementation in any machine-readable language, known or unknown, is broadly contemplated.

TABLE IV

ABSTRACT QUERY EXAMPLE

| | |
|---|---|
| 001 | FIND |
| 002 | Patient ID, Name, HIV Test |
| 003 | WHERE |
| 004 | AgeInYears > 40 |
| 005 | SORT BY |
| 006 | HIV Test |

It should be noted that the abstract query of Table IV is configured to identify from the HIV Tests table of Table III a list of patients which are older than 40 years ("AgeInYears>40" in line 004). The patients should be identified in a corresponding result set by their associated patient identifiers and names ("Patient ID" and "Name" in line 002). Furthermore, for each patient a corresponding HIV test result ("HIV Test" in line 002) is requested. The Patient ID, Name and HIV Test fields define result fields and the AgeInYears field defines a condition field of the abstract query, all of which relate to corresponding logical fields in an underlying data abstraction model (e.g., data abstraction model 292 of FIGS. 2-3). By way of example, the result field "Patient ID" (line 002 of Table IV) relates to the "Patient ID" field in line 006 of the exemplary data abstraction model of Table II. Furthermore, it should be noted that a corresponding result set obtained in response to execution of the exemplary query of Table IV should be sorted on the basis of values that are retrieved for the "HIV Test" result field (lines 005-006).

At step 730, it is determined whether the abstract query includes a sorting instruction (e.g., sorting instruction 262 of FIG. 2). If the abstract query includes a sorting instruction, the method 700 proceeds at step 770. Otherwise, the method 700 proceeds at step 740.

At step 770, it is determined whether the sorting instruction is applied to a result field which has sensitive data. By way of example, it is determined whether the logical field which corresponds to the result field of the sorting instruction has a sensitivity flag. However, it should be noted that any suitable technique for determining whether the sorting instruction is applied to a result field having sensitive data is broadly contemplated. If the sorting instruction is applied to a result field having sensitive data, the method 700 proceeds at step 780. Otherwise, the method 700 proceeds at step 740.

At step 780, suitable operations are performed to protect the sensitive data in the database. Method 700 then exits at step 760.

At step 740, the received abstract query is executed against the underlying database, whereby a corresponding result set is generated. The corresponding result set is output to the user at step 750. Method 700 then exits at step 760.

However, it should be noted that the corresponding result set obtained at step 740 can be analyzed prior to step 750 in order to determine whether sensitive data is included therewith. If so, the result set can be filtered prior to step 750 in order to protect the sensitive data, e.g., by removing the sensitive data from the corresponding result set prior to outputting the result set to the user.

Figure 8:
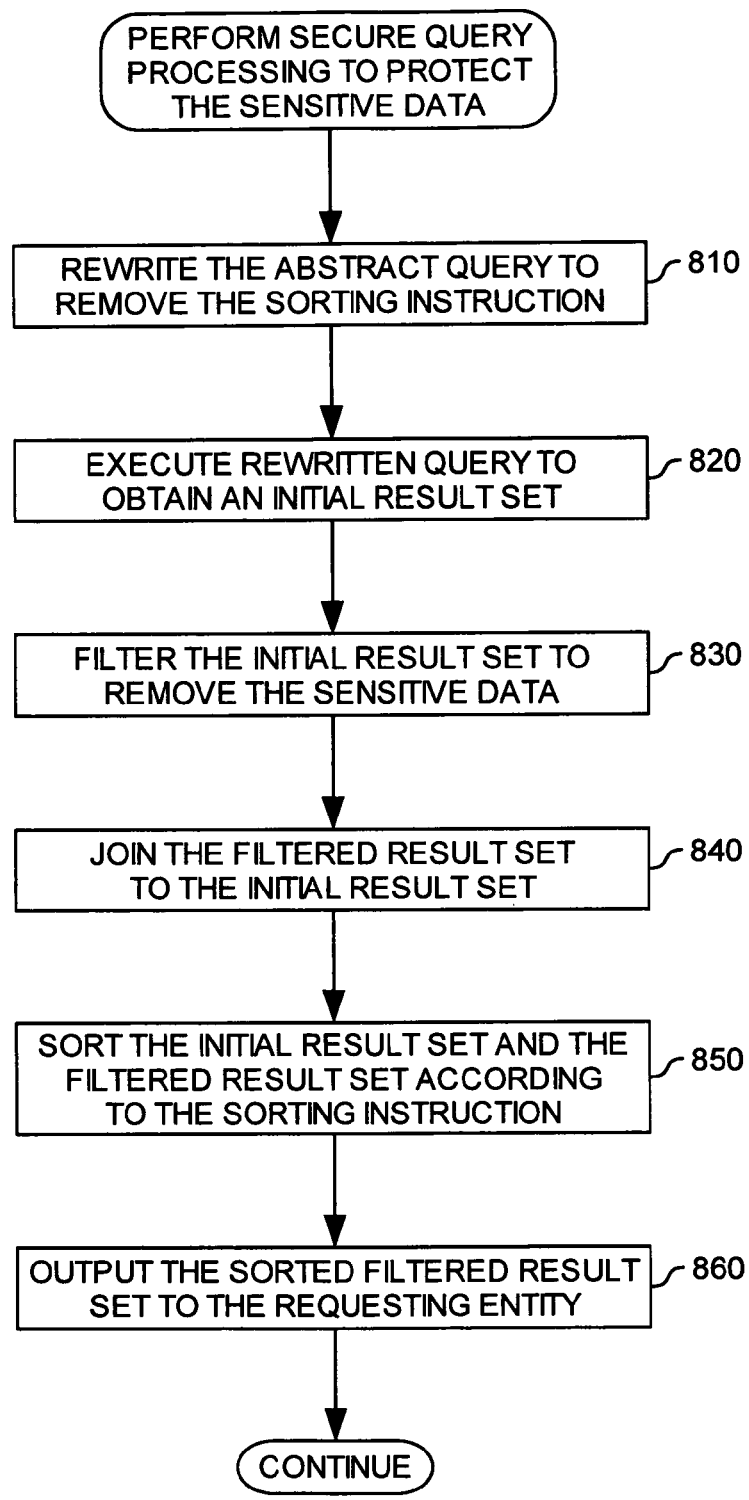
FIG. 8 is a flow chart illustrating a method of protecting sensitive data in an underlying database in one embodiment.

Referring now to FIG. 8, an exemplary method 800 of processing an abstract query (e.g., abstract query 260 of FIG. 2) having a sorting instruction (e.g., sorting instruction 262 of FIG. 2) and a corresponding result set is illustrated. In one embodiment, method 800 is performed to protect sensitive data (e.g., sensitive data 236 of FIG. 2) in an underlying database (e.g., database 230 of FIG. 2). According to one aspect, method 800 is entered from step 780 of FIG. 7. At least a portion of the steps of method 800 is performed using the query execution unit 220 of FIG. 2.

Method 800 starts at step 810, where the abstract query is rewritten to remove the sorting instruction therefrom. Accordingly, a rewritten query (e.g., rewritten query 264 of FIG. 2) without sorting instruction is obtained. An exemplary rewritten query which is obtained from the exemplary abstract query of Table IV is illustrated in Table V below.

TABLE V

REWRITTEN QUERY EXAMPLE

| | |
|---|---|
| 001 | FIND |
| 002 | Patient ID, Name, HIV Test |
| 003 | WHERE |
| 004 | AgeInYears > 40 |

It should be noted that the exemplary rewritten query of Table V corresponds to the exemplary abstract query of Table IV, from which the sorting instruction (lines 005-006 of Table IV) vas been removed.

At step 820, the rewritten query is executed against the underlying database to obtain an initial result set (e.g., result set 234 of FIG. 2). In the given example, the exemplary rewritten query of Table V is executed against the exemplary "HIV Tests" table of Table III. Thereby, the initial result set illustrated in Table VI below is obtained. The exemplary initial result set is ordered in descending order of the patient identifiers.

TABLE VI

EXEMPLARY INITIAL RESULT SET

| | Patient ID | Name | HIV Test |
|---|---|---|---|
| 001 | | | |
| 002 | 2 | Paula Superstar | Negative |
| 003 | 4 | Joe | Negative |
| 004 | 8 | Jane | Negative |
| 005 | 9 | Joe Celebrity | Positive |
| 006 | 12 | Alex | Positive |

As can be seen from line 002 of Table VI, the initial result set includes the value "Negative" for the HIV test result of "Paula Superstar". Furthermore, according to line 005 of Table VI, the initial result set includes the value "Positive" for the HIV test result of "Joe Celebrity". As was noted above, the HIV test results of Paula Superstar and Joe Celebrity represent sensitive data.

To protect the sensitive data included with lines 002 and 005 of Table VI, the initial result set is filtered at step 830 on the basis of predefined filtering rules. In one embodiment, the predefined filtering rules are configured to remove the sensitive data from the initial result set. Removing the sensitive data from the initial result set includes identifying each data record from the initial result set which has sensitive data and replacing each sensitive data value with a "null" value. Accordingly, the filtered result set illustrated in Table VII below is obtained.

TABLE VII

EXEMPLARY FILTERED RESULT SET

| 001 | Patient ID | Name | HIV Test |
|---|---|---|---|
| 002 | 2 | Paula Superstar | null |
| 003 | 4 | Joe | Negative |
| 004 | 8 | Jane | Negative |
| 005 | 9 | Joe Celebrity | null |
| 006 | 12 | Alex | Positive |

As can be seen from lines 002 and 005 of Table VII, the data records associated with the patient identifiers "2" and "9" have been identified as data records having sensitive data in the "HIV Test" field. Accordingly, the actual values for the HIV test results of "Paula Superstar" and "Joe Celebrity" in lines 002 and 005 have been replaced with the value "null".

At step 840, the filtered result set is joined to the initial result set. Accordingly, the joined result set illustrated in Table VIII below is obtained.

TABLE VIII

EXEMPLARY JOINED RESULT SET

| 001 | Patient ID | Name | HIV Test | Patient ID2 | Name2 | HIV Test2 |
|---|---|---|---|---|---|---|
| 002 | 2 | Paula Superstar | Negative | 2 | Paula Superstar | null |
| 003 | 4 | Joe | Negative | 4 | Joe | Negative |
| 004 | 8 | Jane | Negative | 8 | Jane | Negative |
| 005 | 9 | Joe Celebrity | Positive | 9 | Joe Celebrity | null |
| 006 | 12 | Alex | Positive | 12 | Alex | Positive |

As can be seen from Table VIII, the fields of the filtered result set have been added to the initial result set by changing the field names so that each field has a unique field name in the joined result set. More specifically, the name of the "Patient ID" field of the filtered result set has been changed to "Patient ID2", the name of the "Name" field has been changed to "Name2" and the name of the "HIV Test" field has been changed to "HIV Test2".

At step 850, the joined result set is sorted according to the sorting instruction which instructs to sort the result set on the basis of the "HIV test" field (lines 005-006 of Table IV). However, after the sorting the data records having the filtered sensitive data, i.e., the data records in lines 002 and 005 of Table VIII, should be placed at a position which is non-indicative of the values of the removed sensitive data. Accordingly, in one embodiment the sorting is performed on the filtered "HIV Test" field, i.e., the "HIV Test2" field. To this end, the sorting instruction is rewritten as shown in Table IX below.

TABLE IX

REWRITTEN SORTING INSTRUCTION EXAMPLE

| 001 | SORT BY |
|---|---|
| 002 | HIV Test2 |

Sorting the joined result set according to the rewritten sorting instruction produces a sorted joined result set. In the given example, sorting the joined result set of Table VIII according to the rewritten sorting instruction of Table IX produces the sorted joined result set illustrated in Table X below.

TABLE X

EXEMPLARY SORTED JOINED RESULT SET

| 001 | Patient ID | Name | HIV Test | Patient ID2 | Name2 | HIV Test2 |
|---|---|---|---|---|---|---|
| 002 | 4 | Joe | Negative | 4 | Joe | Negative |
| 003 | 8 | Jane | Negative | 8 | Jane | Negative |
| 004 | 12 | Alex | Positive | 12 | Alex | Positive |
| 005 | 2 | Paula Superstar | Negative | 2 | Paula Superstar | null |
| 006 | 9 | Joe Celebrity | Positive | 9 | Joe Celebrity | null |

As can be seen from Table X, the data records in lines 002-004 having "Negative" or "Positive" values in the "HIV Test2" field are placed on top of the sorted joined result set. The data records in lines 005-006, which have a "null" value in the "HIV Test2" field, are placed at the bottom of the sorted joined result set. The order of the data records at the top and the bottom of the sorted joined result field is respectively determined in descending order of the patient identifiers, for simplicity.

However, it should be noted that alternative implementations for steps 840 and 850 are possible. For instance, instead of joining the initial result set and the filtered result set to the joined result set, and sorting the joined result set according to the rewritten sorting instruction, the filtered result set can be sorted according to the initial sorting instruction. All such implementations are broadly contemplated.

At step 860, a sorted filtered result set (e.g., sorted result set 280 of FIG. 2) is generated and, subsequently, output to the user. In one embodiment, the sorted filtered result set is determined by selecting only the result fields of the sorted joined result set, which belong to the filtered result set. In another embodiment, all result fields which belong to the initial result set are selected from the sorted joined result set and refiltered according to step 830 to determine the sorted filtered result set. Processing then continues at step 760 of method 700.

In the given example, the sorted filtered result set illustrated in Table XI below is obtained and output to the user.

TABLE XI

EXEMPLARY SORTED FILTERED RESULT SET

| 001 | Patient ID | Name | HIV Test |
|---|---|---|---|
| 002 | 4 | Joe | Negative |
| 003 | 8 | Jane | Negative |
| 004 | 12 | Alex | Positive |
| 005 | 2 | Paula Superstar | null |
| 006 | 9 | Joe Celebrity | null |

As can be seen from Table XI, the sorted position of the data records of "Paula Superstar" and "Joe Celebrity" in lines 005 and 006 does not allow any conclusion about their actual HIV test result value.

While the foregoing is directed to embodiments of the present invention, other and further embodiments of the invention may be devised without departing from the basic scope thereof, and the scope thereof is determined by the claims that follow.

What is claimed is:

1. A computer-implemented method of managing access to sensitive data in a database, comprising:
   receiving a query against the data in the database, the query comprising at least:
   (i) a result field specification including a plurality of result fields characterizing which fields are to be returned in a result set for the query; and
   (ii) a sorting instruction to sort the result set on the basis of a selected result field of the plurality of result fields;
   retrieving the result set from the database in response to executing the query;
   creating, prior to filtering the retrieved result set, a temporary data structure storing the retrieved result set;
   filtering the retrieved result set on the basis of predefined filtering rules to remove selected data only from the selected result field of at least one data record included with the retrieved result set, while preserving data from each of the other remaining plurality of result fields of the at least one data record;
   joining, after the filtering, the filtered result set to the retrieved result set stored in the temporary data structure to generate a joined result set;
   rewriting the sorting instruction to generate a modified sorting instruction instructing to sort the joined result set for the query on the basis of the selected result field;
   sorting the joined result set according to the modified sorting instruction to produce a sorted result set that includes the at least one data record, whereby the sorting is done independently of the removed selected data so that the sorted result set places the at least one data record at a position which is non-indicative of a value of the removed selected data; and
   outputting a sorted filtered result set comprising one or more data records selected from the sorted result set.

2. The method of claim 1, wherein retrieving the result set comprises:
   removing the sorting instruction from the query, whereby a modified query is generated; and
   executing the modified query against the database.

3. The method of claim 1, wherein filtering the retrieved result set comprises for each data record included with the retrieved result set:
   determining whether the selected result field of the data record comprises sensitive data; and
   if so, replacing the sensitive data with a replacement value.

4. The method of claim 1, further comprising:
   selecting, from the sorted result set, all data records belonging to the filtered result set; and
   wherein the selected data records are output in a sorted list.

5. The method of claim 1, further comprising:
   selecting, from the sorted joined result set, all data records belonging to the retrieved result set;
   filtering all selected data records on the basis of the predefined filtering rules to remove sensitive data from the selected result field of at least one of the selected data records; and
   wherein the filtered selected data records are output in a sorted list.

6. The method of claim 1, wherein each result field of the query is a logical field of a data abstraction model abstractly describing the data in the database;
   whereby the query defines an abstract query, and wherein the data abstraction model is adapted for transforming the one or more logical fields of the abstract query into a form consistent with a physical representation of the data in the database.

7. The method of claim 1, wherein the query is one of a SQL query or an XML query.

8. A computer-readable storage medium containing a program which, when executed by a computer processor, performs operations for managing access to sensitive data in a database, the operations comprising:
   receiving a query against the data in the database, the query comprising at least:
   (i) a result field specification including a plurality of result fields characterizing which fields are to be returned in a result set for the query; and
   (ii) a sorting instruction to sort the result set on the basis of a selected result field of the plurality of result fields;
   retrieving the result set from the database in response to executing the query;
   creating, prior to filtering the retrieved result set, a temporary data structure storing the retrieved result set;
   filtering the retrieved result set on the basis of predefined filtering rules to remove selected data only from the selected result field of at least one data record included with the retrieved result set, while preserving data from each of the other remaining plurality of result fields of the at least one data record;
   joining, after the filtering, the filtered result set to the retrieved result set stored in the temporary data structure to generate a joined result set;
   rewriting the sorting instruction to generate a modified sorting instruction instructing to sort the joined result set for the query on the basis of the selected result field;

sorting the joined result set according to the modified sorting instruction to produce a sorted result set that includes the at least one data record, whereby the sorting is done independently of the removed selected data so that the sorted result set places the at least one data record at a position which is non-indicative of a value of the removed selected data; and outputting a sorted filtered result set comprising one or more data records selected from the sorted result set.

9. The computer-readable storage medium of claim 8, wherein retrieving the result set comprises:

removing the sorting instruction from the query, whereby a modified query is generated; and executing the modified query against the database.

10. The computer-readable storage medium of claim 8, wherein filtering the retrieved result set comprises for each data record included with the retrieved result set:

determining whether the selected result field of the data record comprises sensitive data; and if so, replacing the sensitive data with a replacement value.

11. The computer-readable storage medium of claim 8, wherein the operations further comprise:

selecting, from the sorted result set, all data records belonging to the filtered result set; and wherein the selected data records are output in a sorted list.

12. The computer-readable storage medium of claim 8, wherein the operations further comprise:

selecting, from the sorted joined result set, all data records belonging to the retrieved result set;

filtering all selected data records on the basis of the predefined filtering rules to remove sensitive data from the selected result field of at least one of the selected data records; and wherein the filtered selected data records are output in a sorted list.

13. The computer-readable storage medium of claim 8, wherein each result field of the query is a logical field of a data abstraction model abstractly describing the data in the database; whereby the query defines an abstract query, and wherein the data abstraction model is adapted for transforming the one or more logical fields of the abstract query into a form consistent with a physical representation of the data in the database.

14. The computer-readable storage medium of claim 8, wherein the query is one of a SQL query or an XML query.

* * * * *